United States Patent
Chang

(10) Patent No.: US 8,099,128 B2
(45) Date of Patent: Jan. 17, 2012

(54) PORTABLE ELECTRONIC DEVICE PROVIDING GAMING FUNCTIONS

(75) Inventor: Cheng-Lung Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 543 days.

(21) Appl. No.: 12/349,724

(22) Filed: Jan. 7, 2009

(65) Prior Publication Data

US 2010/0056125 A1    Mar. 4, 2010

(30) Foreign Application Priority Data

Sep. 3, 2008   (CN) .......................... 2008 1 0304354

(51) Int. Cl.
*H04M 1/00* (2006.01)
(52) U.S. Cl. ............... 455/556.1; 455/575.1; 455/575.8; 455/550.1; 455/418; 379/361
(58) Field of Classification Search .............. 455/575.1, 455/575.8, 556.1, 550.1, 418; 379/361
See application file for complete search history.

(56) References Cited

U.S. PATENT DOCUMENTS

| | | | |
|---|---|---|---|
| 4,349,705 A * | 9/1982 | Kuhfus | 379/361 |
| 7,013,168 B2 * | 3/2006 | Nagasawa | 455/575.1 |
| D589,040 S * | 3/2009 | Turner | D14/247 |
| 2008/0051136 A1 * | 2/2008 | Moon et al. | 455/556.1 |

* cited by examiner

*Primary Examiner* — Junpeng Chen
(74) *Attorney, Agent, or Firm* — Altis Law Group, Inc.

(57) ABSTRACT

A portable electronic device includes a keypad, a memory system, and an audio effect system. The memory system includes a video game application and an audio file associated with the video game application. The audio file includes a collection of trigger signals and a collection of notations where each trigger signal is associated with a corresponding notation. The audio effect system includes an audio player, a signal generator, and a control module. The signal generator is configured for generating a trigger signal in response to operation of the keypad. The control module is configured for reading a notation from the audio file, which corresponds to the generated trigger signal and instructing the audio player to play a corresponding music sound associated with the read notation.

15 Claims, 2 Drawing Sheets

PORTABLE ELECTRONIC DEVICE PROVIDING GAMING FUNCTIONS

BACKGROUND

1. Technical Field

Embodiments of the present disclosure relate to portable electronic devices, and particularly to a portable electronic device providing gaming functions in accompany with audio effects.

2. Description of the Related Art

Most portable electronic devices such as mobile telephones provide gaming function without any accompany audio effects thereby limiting interaction with video games.

Accordingly, it is desirable to provide a portable electronic device which can overcome the above-mentioned problem.

DETAILED DESCRIPTION

Figure 1:
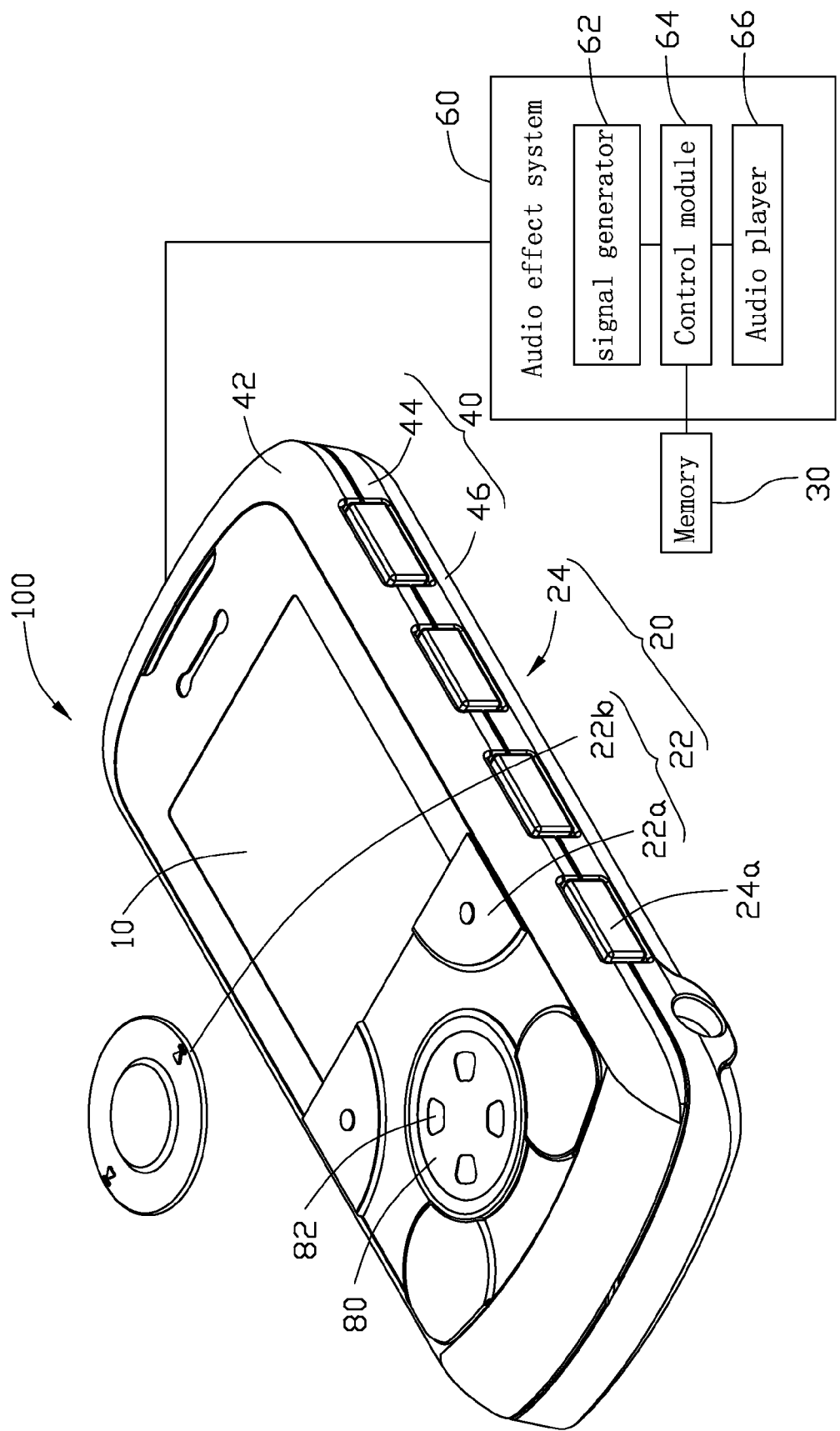
FIG. 1 is a schematic view of a portable electronic device having a first keypad segment according to an embodiment of the present disclosure.

Embodiments of the disclosure will now be described in detail with references to the accompanying drawings. In the following described embodiment, the portable electronic device, as shown in FIG. 1, is a mobile telephone. However, in other alternative embodiments, the portable electronic device can be, but is not limited to, a camera or a gaming device.

Referring to FIG. 1, a portable electronic device 100 according to an embodiment of the present disclosure includes a display 10, a keypad 20, a memory system 30, and an audio effect system 60. The memory system 30 includes a video game application and an audio file. When the video game application is invoked, corresponding video game images are generated and displayed on the display 10 and controlled interactively via the keypad 20. The audio file is associated with the video game application. The audio file can be invoked by the video game application and processed by the audio effect system 60 to produce interactive game sounds according to operations on the keypad 20.

In the illustrated embodiment, the portable electronic device 100 includes a front surface 42, two parallel side surfaces 44, and a bottom surface 46. The front surface 42 faces away the bottom surface 46. The side surfaces 44 are substantially perpendicular to the front surface 42. The keypad 20 is divided into two segments: a first keypad segment 22 and a second keypad segment 24. The first keypad segment 22 is disposed on the front surface 42. The second keypad segment 24 is disposed on one of the side surfaces 44 (e.g., the right side surface in one embodiment).

The first keypad segment 22 includes four function keys 22a and a navigation key 22b. The navigation key 22b is disposed on the center of the first keypad segment 22. The function keys 22a surround the navigation key 22b. The second keypad segment 24 includes four shortcut keys 24a linearly arranged on the side surface 44. It is to be noted that although four function keys 22a and four shortcut keys 24a are exemplarily illustrated herein, less or more function keys 22a and/or shortcut keys 24a may be optionally adopted in the present portable electronic device in other alternative embodiments by those of ordinary skill in the art and therefore be within the scope thereof. Also, the arrangement/layout of the first and second keypad segments are not limited by this embodiment.

All the function keys 22a, the navigation key 22b and the shortcut keys 24a are adapted to, when operated, signal the audio effect system 60 to read a corresponding notation from the audio file and reproduce a predetermined sound correspondingly. For example, pressing the navigation key 22b may cause the audio effect system 60 to reproduce a walking sound beat, double pressing the navigation key 22b may cause a running sound beat, pressing one of the function keys 22a or shortcut keys 24a may reproduce a corresponding video game background music or a snippet of pre-recorded dialog sound, for example.

The audio effect system 60 includes a signal generator 62, a control module 64, and a audio player 66. The signal generator 62 is configured for generating trigger signals in response to the operation of the keypad 20. The control module 64 is configured for reading the audio file, thereby signaling the audio player 66 to play a corresponding sound.

The portable electronic device 100 provides the audio file and the audio effect system 60. The audio file is capable of mapping the operations of the keypad 20 with audio effects reproducible by the audio effect system 60 to improve an interactive experience of the portable electronic device 100.

It should be mentioned that, in practice, the memory system 30 may store more than one video game applications and audio files. Each audio file is associated with corresponding video game application. As a consequence, each game has a unique audio effect.

Figure 2:
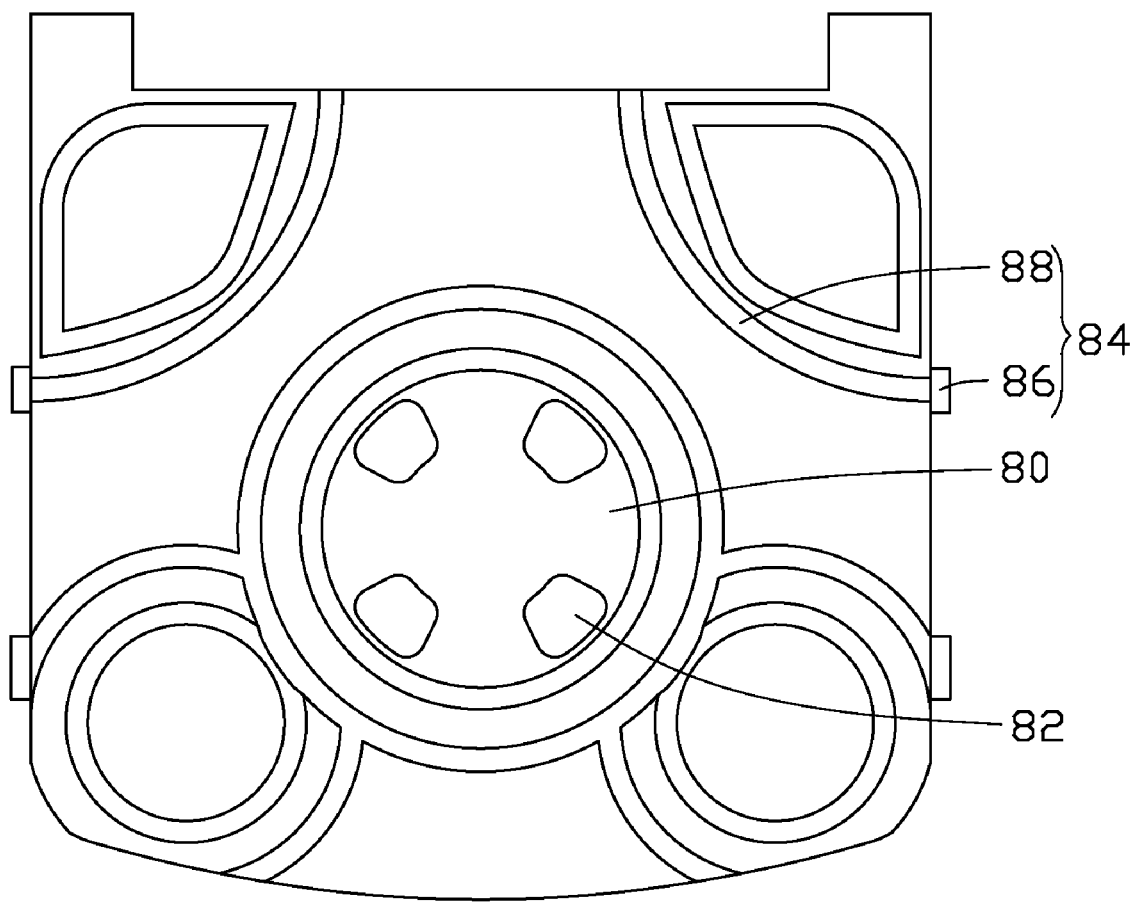
FIG. 2 is a planar enlarged view of the first keypad segment of FIG. 1.

The audio player 66 may be accommodated within the portable electronic device 100. The keypad segments 22, 24 may be encapsulated with a dustproof film 80. A plurality of small through holes 82 can be defined in the film 80 to allow broadcasting of music from a corresponding video game. The small through holes 82 are configured for improving the broadcast of the game musical sound. In the illustrated embodiment, four through holes 82 are defined on the film 80 encapsulating the first keypad segment 22 (See FIG. 2).

In order to allow users to play games in the dark, a light emitting device 84 can be provided and disposed on the first keypad segment 22 and/or the second keypad segment 24. In the embodiment, the light emitting device 84 is disposed around the function keys 22a and the navigation key 22b.

The light emitting device 84 includes a light source 86 and a light guiding member such as a light-guiding tube 88. The light guiding member 88 extends and surrounds the first keypad segment 22a and/or the second keypad segment 22b. The light source 86 is disposed on one end portion of the light guiding member 88. The light guiding member 88 can be made from glass or transparent plastic. In the embodiment, the light guiding member 64 is made from transparent plastic, and the light source 86 is a light-emitting diode.

It is to be understood, however, that even though numerous characteristics and advantages of the embodiments have been set forth in the foregoing description, together with details of the structures and functions of the embodiments, the disclosure is illustrative only, and changes may be made in detail, especially in matters of arrangement of parts within the principles of the invention to the full extent indicated by the broad general meaning of the terms in which the appended claims are expressed.

What is claimed is:

1. A portable electronic device comprising:
   a front surface;
   two parallel side surfaces being substantially perpendicular to the front surface;

a keypad, the keypad including a first keypad segment and a second keypad segment, the first keypad segment disposed on the front surface, the second keypad segment disposed on one of the two side surfaces and including four shortcut keys linearly arranged on the side surface;

a memory system comprising a video game application and an audio file associated with the video game application, the audio file comprising a collection of trigger signals and a collection of notations where each trigger signal is associated with a corresponding notation;

an audio effect system comprising:
  an audio player;
  a signal generator configured for generating a trigger signal in response to operation of the keypad; and
  a control module configured for reading a notation from the audio file, which corresponds to the generated trigger signal and instructing the audio player to play a corresponding music sound associated with the read notation;
  wherein operating the first keypad segment controls the audio effect system to play sound beats, and operating the four shortcut keys controls the audio effect system to play corresponding music.

2. The portable electronic device as claimed in claim 1, wherein the first keypad segment is encapsulated with a dustproof film.

3. The portable electronic device as claimed in claim 2, wherein four through holes are defined on the dustproof film of the first keypad segment.

4. The portable electronic device as claimed in claim 1, wherein the first keypad segment comprises four function keys and a navigation key, the navigation key is disposed on the center of the first keypad segment, the function keys surround the navigation key.

5. The portable electronic device as claimed in claim 4, wherein the function keys further comprises a light emitting device disposed around the function keys.

6. The portable electronic device as claimed in claim 5, wherein the light emitting device comprises a light source and a light guiding member, the light guiding member extending and surrounding the function keys, the light source being disposed on one end portion of the light guiding member.

7. The portable electronic device as claimed in claim 6, wherein the light guiding member is made from glass or transparent plastic.

8. The portable electronic device as claimed in claim 6, wherein the light source is a light emitting diode.

9. The portable electronic device as claimed in claim 5, wherein the navigation key further comprises a light emitting device disposed around the navigation key.

10. The portable electronic device as claimed in claim 9, wherein the light emitting device comprises a light source and a light guiding member, the light guiding member extending and surrounding the navigation key, the light source being disposed on one end portion of the light guiding member.

11. The portable electronic device as claimed in claim 10, wherein the light guiding member is made from glass or transparent plastic.

12. The portable electronic device as claimed in claim 10, wherein the light source is a light emitting diode.

13. The portable electronic device as claimed in claim 4, wherein operating the navigation key controls the audio effect system to play walking sound beats and running sound beats.

14. The portable electronic device as claimed in claim 13, wherein operating the function keys controls the audio effect system to play corresponding video game music and snippets of pre-recorded dialog sound.

15. The portable electronic device as claimed in claim 13, wherein operating the shortcut keys controls the audio effect system to play corresponding video game music and snippets of pre-recorded dialog sound.

* * * * *